(12) United States Patent
Sperandei

(10) Patent No.: US 8,282,044 B2
(45) Date of Patent: Oct. 9, 2012

(54) ACTUATOR DEVICE FOR VARYING THE ATTITUDE OF A SPACECRAFT

(75) Inventor: Jean Sperandei, Toulouse (FR)

(73) Assignee: Astrium SAS, Paris (FR)

( * ) Notice: Subject to any disclaimer, the term of this patent is extended or adjusted under 35 U.S.C. 154(b) by 269 days.

(21) Appl. No.: 12/866,875

(22) PCT Filed: Feb. 3, 2009

(86) PCT No.: PCT/EP2009/051205
§ 371 (c)(1),
(2), (4) Date: Aug. 9, 2010

(87) PCT Pub. No.: WO2009/101006
PCT Pub. Date: Aug. 20, 2009

(65) Prior Publication Data
US 2011/0006162 A1     Jan. 13, 2011

(30) Foreign Application Priority Data
Feb. 11, 2008   (FR) ...................................... 08 50846

(51) Int. Cl.
*B64G 1/28* (2006.01)

(52) U.S. Cl. ........................................ 244/165; 244/164

(58) Field of Classification Search .................. 244/164, 244/165, 158.6, 171; 701/13; 320/166, 167
See application file for complete search history.

(56) References Cited

U.S. PATENT DOCUMENTS 6,439,510 B1 * 8/2002 Barde .......................... 244/165
2007/0023580 A1   2/2007 Hart et al.

FOREIGN PATENT DOCUMENTS

| EP | 0712781 A1 | 5/1996 |
| EP | 1095852 A1 | 5/2001 |
| WO | WO-2004007228 A2 | 1/2004 |

OTHER PUBLICATIONS

International Search Report, International Application No. PCT/EP2009/051205, dated May 20, 2009.
Written Opinion of the International Searching Authority, International Application No. PCT/EP2009/051205, dated May 20, 2009.
Varatharajoo R. et al., "Flywheel Energy Storage for Spacecraft", Aircraft Engineering and Aerospace Engineering, vol. 76, No. 4, 2004, pp. 384-390.

* cited by examiner

*Primary Examiner* — Timothy D Collins
*Assistant Examiner* — Jamie S Stehle
(74) *Attorney, Agent, or Firm* — Gardere Wynne Sewell LLP; Andre M. Szuwalski

(57) ABSTRACT

An actuator device for varying the attitude of a spacecraft includes a reversible conversion chain of electrical energy to mechanical rotation energy of a flywheel. The electrical energy is stored in a capacitive element that may be a supercapacitor. The actuator device also includes an electrical power converter, connected, on one hand, to the capacitive element and intended to be connected, on the other hand, to the spacecraft power bus. The converter makes it possible to compensate for losses to keep a total energy of the actuator device constant.

16 Claims, 6 Drawing Sheets

ACTUATOR DEVICE FOR VARYING THE ATTITUDE OF A SPACECRAFT

The present invention relates to an actuator device which is suitable for varying the attitude of a spacecraft, such as a satellite.

CONTEXT OF THE INVENTION

Space observation missions of the Earth involve an increasing number of constraints. Attempts are particularly made to maximise the number of exposures and the image resolution. For this purpose, it is of major benefit to be able to tilt the line of sight of the image capture instrument rapidly. In other words, it should be possible to rotate the satellite easily and rapidly, in order to change its attitude. This in particular makes it possible to increase the field of view outside the trace of the satellite, and improve the stereoscopic exposure capacities.

However, for a long time, this need for rapid variation of the satellite attitude was limited by the performances of the actuator devices used for this type of mission, i.e. reaction wheels. From this point of view, the use of gyroscopic actuators represented an important step, as it made it possible to increase attitude variation capabilities of the satellite, while limiting the increase in the mass and the energy consumption of the satellite platform.

However, gyroscopic actuators involve some drawbacks, due to the fact that the output torque produced by this type of actuators is a rotating gyroscopic torque. This feature particularly complicates the rotations of the satellite about a fixed axis, and the attitude control algorithms of the satellite.

In a known manner, reaction wheel devices comprise a motor wherein the stator is secured on the satellite platform, and wherein the rotor is connected in rotation to a flywheel. This wheel makes it possible to increase the inertia of the rotor, and when a torque is produced by the motor on the rotor, a reaction torque is produced in the opposite direction on the satellite platform. The highest torques that can be produced in this way are less than 1 N.m (Newton×meter) for the majority of reaction wheels currently available. This is particularly applicable to all reaction wheels that can be installed on small satellites weighing less than 1 tonne. However, for highly attitude-varying satellites, torques of the order of 5 to 10 N.m are targeted when the mass of the satellite is a few hundred kilograms, and torques of a few dozen N.m when the mass of the satellite is greater than 1 tonne.

The torque limitation liable to be produced by a reaction wheel is due to the very high electrical power required to accelerate or decelerate the rotor. This power may reach a few kilowatts (kW) according to the application in question. In this way, the maximum torque that can be produced is fixed by the maximum electric power that the electrical power supply system of the satellite is capable of supplying. Moreover, in the usual design of a reaction wheel device, energy is dissipated in the motor control electronics during braking of the rotor. This energy loss also represents a significant limitation for the capability of attitude variation for the satellite.

Some of these limitations are pushed back by the disclosure of the document US 2007/0023580, which describes a kinetic momentum transfer system between at least two reaction wheels used to control the attitude of a spacecraft. In this system, each wheel comprises a flywheel which is driven by a motor-generator, the latter being connected to a reversible electrical power supply. The motor-generators make it possible to transfer kinetic energy between the two wheels, or produce electrical energy. When a torque is requested, which requires for example that a first wheel be accelerated while the second wheel is braked, a power regulator couples both actions so that the motor-generator of the first wheel operates as a motor and the motor-generator of the second wheel operates as a generator. The electrical energy which is produced by the motor-generator of the second wheel is then transferred to the motor-generator of the first wheel. In this system, excess electrical energy produced is consumed in an auxiliary resistor, and a quantity of electrical energy which cannot be supplied by the regulator is supplied by the electrical power supply line (or "power bus") of the spacecraft.

However, a system such as that described in document US 2007/0023580 comprises several other limitations. First of all, the transfer of kinetic energy from one wheel to another uses two intermediate control electronic systems. This results in an accumulation of the efficiency losses from the two control electronic systems, and efficiency losses which are associated with the two simultaneous conversions of kinetic energy to electrical energy and electrical energy to kinetic energy, or vice versa.

Another drawback is that the excess energy liable to be generated by two wheels which are coupled during a manoeuvre is lost by being dissipated in a resistor. Moreover, when it is necessary to accelerate all the wheels simultaneously, which is frequently the case when the spacecraft is rotated with a maximum torque, energy transfer between the wheels is not possible and a high electrical power must be supplied by the spacecraft power bus. This electrical power which is supplied by the spacecraft power bus and, subsequently, the torque liable to be produced by the system, is in turn limited by the pass-band of conventional spacecraft electrical power supply systems. Such high-power transitory states may disturb the operation of other useful equipment onboard the spacecraft and also reduce the service life of the batteries used onboard.

To prevent this limitation, it would be possible to use a cluster of at least four wheels, instead of three, to control the attitude of the spacecraft along three axes, and use this redundancy to create an energy reserve which would be designed with respect to the manoeuvres to be carried out. The energy reserve would result from high speeds of all the wheels, which would also be arranged so that the sum of the kinetic momentums of the four wheels is zero. Such a zero-addition of the kinetic momentums is possible due to the kinematic redundancy of the wheels. Part of the kinetic momentums of one wheel could then be transferred to another, to produce the desired torques in all directions without ever using excessive electrical power from the spacecraft power bus.

Therefore, a first drawback is that such a system always requires an extra reaction wheel, with respect to the minimum number of wheels required.

A second drawback of this solution lies in the fact that some of the wheels operate continuously at relatively high rotation speeds. This would appear to reduce their lifetime due to inevitable flywheel balancing defects. However, such vibrations are detrimental to a stability of the line of sight of an onboard optical instrument.

Finally, the electronic power regulation system for all the reaction wheels represents additional centralised electronics, which is an additional source of failure. Therefore, it would be necessary to duplicate it, but this would further increase the complexity of the system.

Moreover, it is also known to use electrical energy storage elements such as supercapacitors, to convert mechanical energy to electrical energy reversibly. Such electrical energy storage elements offer the advantage, over batteries, of having a shorter charging or discharging response time, and a longer service life.

For example, the document FR99 13631 describes a kinetic energy storage device which comprises two aligned and counter-rotating flywheels, rotating at a very high speed, and each connected to a motor-generator. The motor-generator operates in motor mode to accelerate the flywheels in the opposite direction in order to store the energy received by the device in the form of kinetic energy, and in generator mode to recover the electrical energy by decelerating the flywheels. This document discloses the use of a supercapacitor to supply the electrical power required for high transitory power requests, which makes it possible to limit the use of flywheels to slow power request variations. The purpose of this device is to prevent significant accelerations or decelerations of the flywheels liable to result from high transitory power requests and liable to generate parasitic torques that are too high to be compensated by means of satellite attitude control. Consequently, such a device limits by the nature thereof the torques liable to be produced by the acceleration or deceleration of the flywheels, and the use thereof may therefore not make it possible to increase the rotating capability of a spacecraft.

Another example of use of supercapacitors is given by FR 2 842 144 is a completely different field of application, as it consists of power transmission for a motor vehicle. The device according to FR 2 842 144 comprises a thermal engine which is coupled mechanically with an electrical motor, and a supercapacitor which is coupled electrically with the electrical motor. The supercapacitor is used to recover and store the kinetic energy of the vehicle during braking, and to restore it when the vehicle speed has stabilised, i.e. when the power required is low, the thermal motor being shut down in this case. Therefore, the supercapacitor operates at a low discharge power, typically one third of the charge power in the application described. The thermal motor is used for high power requests. Such an operation is therefore not suitable for producing high torques electrically during transient states at non-stabilised speed.

As a result, none of the devices already known makes it possible to increase the rotating capability of a spacecraft, and a significant requirement remains for a new actuator device which would meet this requirement.

SUMMARY OF THE INVENTION

For this purpose, the invention proposes an actuator device which is suitable for varying the attitude of a spacecraft, and which comprises a reversible conversion chain of electrical energy to mechanical energy, including the following components:
- a flywheel, which is arranged to rotate about at least one axis of rotation;
- a reversible operation motor-generator, which is coupled with the flywheel by means of a rotation drive about the axis of rotation of the flywheel;
- control electronics, connected electrically to the motor-generator;
- a capacitive electrical energy storage assembly, which is connected electrically to the control electronics; and
- an electrical power converter, which is connected, on one hand, to the capacitive assembly and which is intended to be connected, on the other hand, to a power bus of the spacecraft to feed the capacitive assembly from said power bus.

The control electronics are suitable for selecting, using at least one set-point which is representative of a torque to be produced along the axis of rotation and which is transmitted to said control electronics, either operation in motor mode or operation in generator mode of the motor-generator, and for adjusting a transfer of electrical energy from the capacitive assembly to the motor-generator for the motor mode, or from the motor-generator to the capacitive assembly for the generator mode, in order to produce an acceleration or deceleration of the flywheel respectively about the axis of rotation, suitable for producing a reaction torque on the spacecraft corresponding to the set-point.

Therefore, such an actuator device according to the invention is based on the reaction wheel principle. It may produce high torques oriented along fixed axes. Consequently, a simple control of spacecraft attitude change may be used. In particular, flywheels which are arranged along axes of rotation perpendicular with each other may be controlled independently from each other.

Another advantage is that this type of device makes it possible to deliver high-power torques separately with respect to the satellite electrical power supply system. The architecture of the satellite electrical power supply system may in this case be simplified, by minimizing transitory power requests.

It is possible to produce the device with a flywheel which is maintained in rotation about a fixed axis by ball bearings or magnetic bearings.

Advantageously, the capacitive electrical energy storage assembly may comprise at least one supercapacitor. This energy storage component has numerous advantages over batteries which are generally used onboard satellites, particularly with respect to the instantaneous power that can be delivered, the mass, dimensions, lifetime and cost.

In this way, the capacitive assembly supplies the power required to produce the torques required, even in the case of torques which are very high to rotate the satellite for very short times, using high rotation speeds. For this purpose, the capacitive assembly may be selected to be able to store a large quantity of energy, and operate at very high charging or discharging powers.

In particular, the capacitive assembly may have an electrical energy storage capacity greater than 5000 J, and a charging or discharging power greater than 1000 W.

Irrespective of the embodiment, said device offers the following advantages:
- it may produce high torques, which may be greater than 3 N.m (Newton×meter), and may reach 10 N.m. Indeed, these torques are produced from transfers of electrical energy with the capacitive assembly, which may correspond to high electrical currents;
- it may have a limited total mass, typically of 10 to 30 kg, which is particularly advantageous with respect to the total mass constraint of the spacecraft. Indeed, the device may only comprise a single flywheel per axis of rotation;
- it has an energy consumption, from the spacecraft power bus, which is reduced as the kinetic energy from the flywheel is recovered during a deceleration thereof, in the form of electrical energy stored in the capacitive assembly; and
- it makes it possible to obtain a very low vibration level, particularly during exposures, as the energy may then be stored essentially in electrical form in the capacitive assembly, the flywheel rotation speed being low in this case.

The set-point representative of the torque to be produced may correspond to a value of an electric current flowing in the motor-generator, the torque to be produced by the motor-generator or a variation of a kinetic momentum of the flywheel.

In one advantageous embodiment, the set-point may correspond to a value of an electrical current flowing in the motor-generator, and said actuator device may also comprise at least one measurement sensor of said current flowing in the motor-generator, and the control electronics may be suitable for adjusting the electrical energy which is transferred between the motor-generator and the capacitive assembly as a function of a deviation between the set-point and a measurement of the current flowing in the motor-generator.

According to a particular embodiment of the device, the motor-generator is of brushless multiphase synchronous type.

According to a particularly simple embodiment of an actuator device according to the invention, the control electronics may be suitable for adjusting the transfer of electrical energy between the capacitive assembly and the motor-generator by modifying a cyclic switching ratio at least one input thereof. In this case, the cyclic ratio may be modified automatically, in a closed loop, as a function of the desired operating mode, i.e. motor or generator, and as a function of the deviation existing between the measurement of the current flowing in the motor-generator and the current required to create the desired torque.

Such an adjustment mode makes it possible to control the value of the torque which is transmitted to the flywheel in a particularly precise manner.

In addition, in a device according to the invention, energy losses are compensated using the spacecraft power bus by only implementing compensation power levels which are low, and during periods of time which are much longer than the attitude variation durations. Such energy losses may be caused by the electrical resistors of the device, and various forms of friction. In particular, the electrical power supplied by the spacecraft power bus to compensate losses may be approximately ten times less, at least, than the electrical power transferred between the motor-generator and the capacitive assembly. In this way, the actuator device does not disturb the power supply of other items of equipment using electrical energy which are onboard the spacecraft.

For this purpose, the electrical power converter may be suitable for controlling an additional transfer of electrical energy from the spacecraft power bus to the capacitive assembly, according to at least one set-point which is representative of a total energy value of the actuator device and which is received by the electrical power converter. Within the scope of the present invention, the term total energy of the actuator device refers to the sum of the kinetic energy of rotation of the flywheel and the electrical energy stored in the capacitive assembly.

If applicable, in order to further increase the value of the torques which can be produced, the capacitive assembly may be charged from the spacecraft power bus, for a suitable time before carrying out a rapid attitude variation of the spacecraft. For this purpose, it is possible to accumulate beforehand in the capacitive assembly a charge quantity which is intended to be subsequently transferred to the motor-generator to produce a high torque. Symmetric operation may also be implemented to produce a high torque in the opposite direction from a flywheel deceleration.

The invention also proposes an actuator system which comprises several actuator devices as described above, at least two of said devices, sharing one hand same common capacitive electrical charge storage assembly and one hand same common electrical power converter, which is connected to said common capacitive assembly.

In this case, for each actuator device of the system, the control electronics may be suitable for controlling transfers of electrical energy between the corresponding capacitive assembly and motor-generator, so that the flywheel of each actuator device produces a torque component parallel with at least one axis of rotation of said flywheel, in accordance with a set-point which is received by the control electronics of the same actuator device.

In this case again, the common electrical power converter may be suitable, preferentially, for controlling an additional transfer of electrical energy from the spacecraft power bus to the common capacitive assembly, in accordance with at least one set-point which is representative of a value of the total energy of the at least two actuator devices, said total energy of the at least two actuator devices being equal to the sum of the respective total energies thereof.

If applicable, the common electrical power converter may also be suitable for controlling the additional transfer of electrical energy so that the transfer is equal to a sum of additional transfers of electrical energy controlled respectively for the actuator devices, if said devices were each used separately.

The invention also proposes a spacecraft attitude control system, which comprises at least one actuator device as described above. In particular, it may comprise at least three independent actuator devices, each of these devices being separately in accordance with the invention. In this case, the three actuator devices may be arranged so as to produce torques independently in three different directions.

The invention also proposes another spacecraft attitude control system, which comprises an actuator system with at least two actuator devices, which have a common electrical energy storage assembly and electrical power converter.

These attitude control systems may be suitable for calculating set-points for torques be produced about at least one axis of rotation of a flywheel of an actuator device, on the basis of deviations between, on one hand, kinematic parameters such as the attitude and/or rotation speed of the spacecraft about said at least one axis and, on the other hand, set-points which correspond to said kinematic parameters.

Finally, the invention proposes a use of an attitude control system as described above, onboard a spacecraft which is intended to perform in rotations about a determined axis of rotation $\Delta$ of said craft. According to this use, the total energy of at least one actuator device of the attitude control device is adjusted to a value greater than or equal to $$\frac{1}{2 \times \gamma(\Delta)^2} \times J_{craft}(\Delta) \times \Omega_{max}^2 \times \frac{J_{craft}(\Delta)}{J_{flywheel}}$$

where $J_{craft}(\Delta)$, $\Omega_{max}$ and $J_{flywheel}$ are respectively a moment of inertia of the spacecraft about the determined axis of rotation $\Delta$ of said craft, a maximum rotation speed of the spacecraft about the determined axis of rotation of said craft, and a moment of inertia of the actuator device in question about the axis of rotation of said flywheel. Moreover, in the above formula, $\gamma(\Delta)$ denotes an amplification factor between, on one hand, the maximum kinetic momentum $H(\Delta)$ liable to be produced by the actuator device along the direction $\Delta$, and, on the other hand, the maximum kinetic momentum $H_{flywheel}$ liable to be produced by a flywheel of the actuator device along at least one axis of rotation, according to the formula $H(\Delta) = \gamma(\Delta) \times H_{flywheel}$.

DESCRIPTION OF FIGURES

Other features and advantages of the present invention will appear in the description hereinafter of non-limitative examples of embodiments, with reference to the appended figures, wherein.

DETAILED DESCRIPTION OF THE INVENTION

The invention is now described in detail in the context of satellite attitude control, but it is understood that it may be used in a similar manner for other types of spacecraft.

Figure 1:
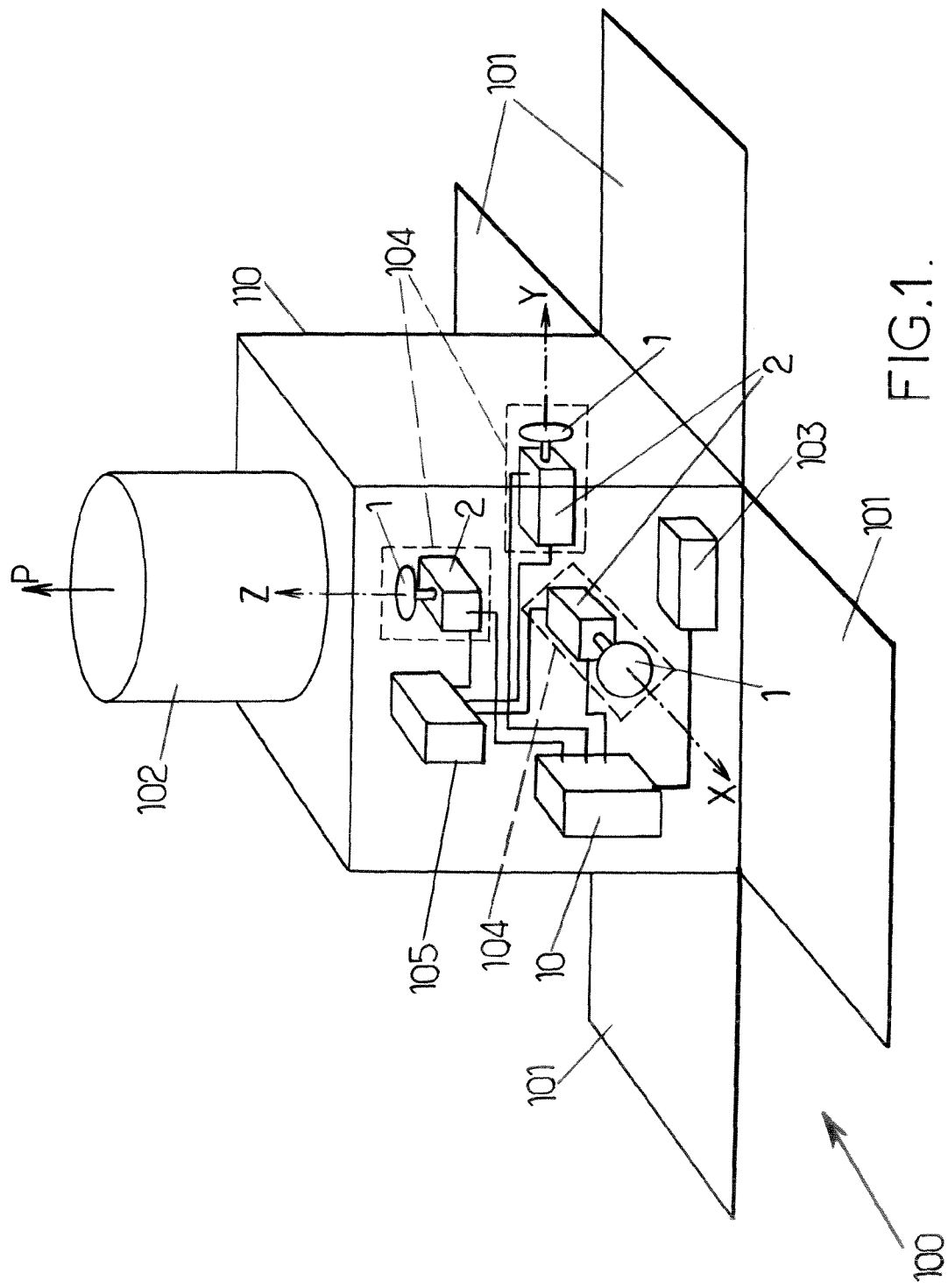
FIG. 1 is a principle diagram illustrating a layout of actuator devices according to the invention onboard a satellite.

Therefore, FIG. 1 represents a satellite 100 equipped with solar panels 101 and an observation instrument 102. This instrument may be stowed directly on the platform 110 of the satellite, such that the pointing direction P of the instrument 102 is fixed with respect to the platform 110. Therefore, changes in the direction P are made by modifying the orientation of the satellite 100, also referred to as the satellite attitude. In a known manner, the satellite 100 is provided with an autonomous electrical power supply system connected to the solar panels 101, and which comprises in particular a battery assembly 103 and main power supply box 10. Said box 10 has at the output thereof, electrical power supply connections with a determined voltage, referenced Va in the figures and equal to 25 or 50 V (volt) for example. One of these terminals is generally connected to the ground of the platform 110, and the other is generally referred as the power bus of the satellite 100. The various instruments that use electrical energy onboard the satellite 100 are then connected to the power supply between said power bus and the ground of the satellite.

FIG. 1 also shows a schematic representation of three actuator devices according to the invention, which are referenced 104 and which comprise respective flywheels 1. The three flywheels 1 are arranged to rotate about respective axes referenced X, Y and Z of an orthogonal trihedron connected to the platform 110. Each actuator device 104 is connected to the power bus, and to the ground, and makes it possible to tilt the satellite 100 about the axis of rotation of the corresponding flywheel 1, by means of a reaction with a flywheel acceleration or deceleration torque. A central satellite trajectory and attitude computer, referenced 105, is connected to each actuator device 104 to transmit to same a set-point, for example in the form of an electrical signal. This set-point indicates a value of a torque which is intended to be produced by the actuator device in question on the axis of the corresponding flywheel and advantageously a total energy value to be contained by said device. In this way, it is possible to tilt the satellite 100 to orient the pointing direction P precisely to an external object to be photographed, and stabilise the platform 110 in said orientation during exposure, while maintaining the total energy of the device between minimum and maximum limits necessary and sufficient to complete the mission.

Figure 2:
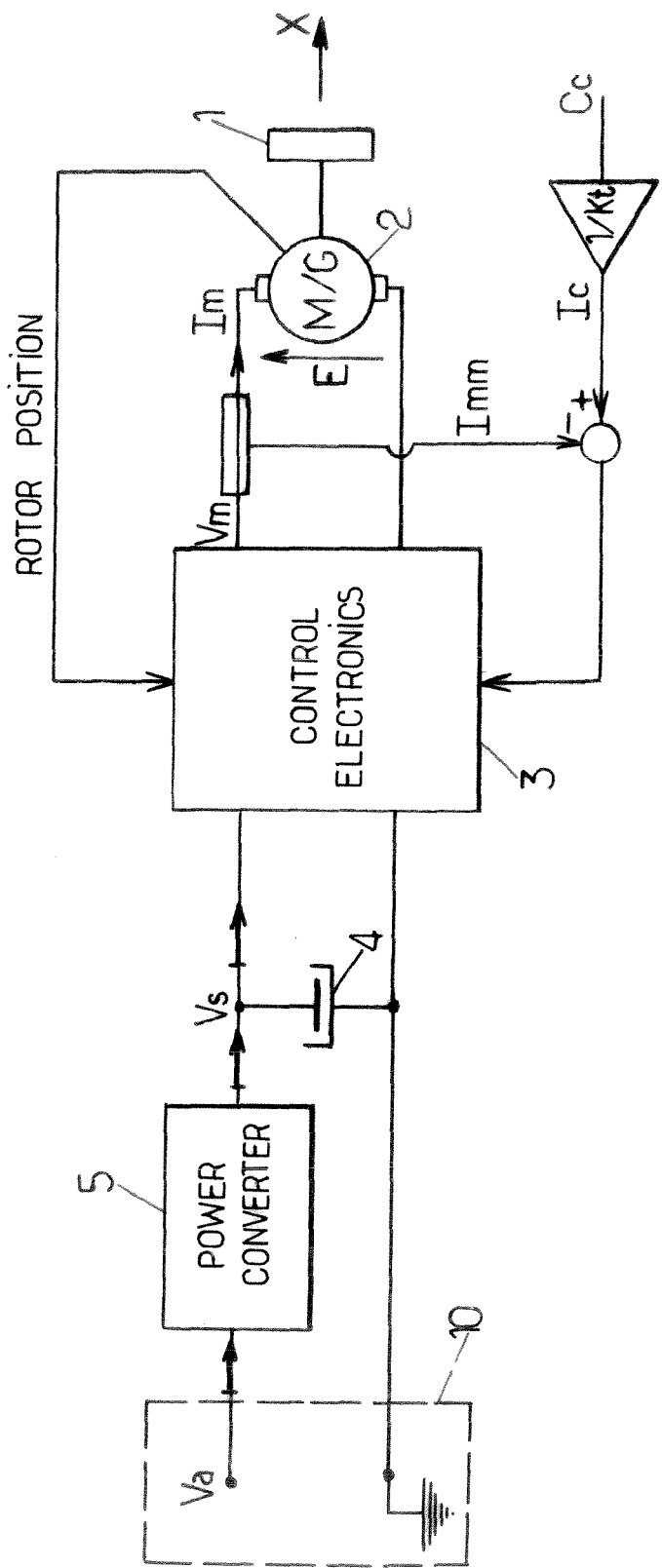
FIG. 2 is a synoptic diagram of an actuator device according to the invention.

According to FIG. 2, each actuator 104 comprises the following components: the flywheel 1, a motor-generator 2, control electronics 3 and a supercapacitor 4. These components are connected to each other to form a reversible conversion chain of kinetic rotation energy of the flywheel 1 to electrical energy corresponding to the electrical charge contained in the supercapacitor 4. The supercapacitor 4 is connected electrically to two terminals of the electronics 3 on a first side of the conversion chain, and the stator of the motor-generator 2 is connected electrically to two other terminals of the electronics 3 on a second side of the conversion chain. The stator is fixed on the platform 110 of the satellite, and the flywheel 1 is assembled with the rotor of the motor-generator 2 to be driven in rotation by the same.

Moreover, the supercapacitor 4 is connected electrically to the power supply box 10. More specifically, one of the two terminals of the supercapacitor 4 may be connected to the ground of the satellite 100, and the other terminal of the supercapacitor 4 is connected to the power bus via an electrical power converter, referenced 5.

The general operation of the actuator device in FIG. 2 is now described, in the simple case of tilting of the satellite about the axis X of the flywheel 1. For such an attitude variation, only one of the actuator devices 104 is used, as the torque produced remains parallel with the X axis, according to the reaction wheel principle. In addition, it is assumed that the respective rotation speeds of the satellite and the flywheel of the actuator device in question are practically zero, or very low, in the initial state and the final state.

The operation profile is generally divided into two or three successive phases: an acceleration phase of the satellite in rotation about the X axis, a rotation phase of the satellite at constant speed about the X axis, followed by a rotation deceleration phase about the same axis. The acceleration and deceleration phases are carried out by accelerating and decelerating the flywheel 1 according to the speed variation profiles which are calculated to create suitable reaction torques on the platform 110. During the intermediate phase, the flywheel 1 rotates at a practically constant speed.

At the start of the operation, the speed of the flywheel 1 is low and the supercapacitor 4 is charged, preferentially to the maximum. During the acceleration phase, the control electronics 3 perform a transfer of electrical energy from the supercapacitor 4 to the motor-generator 2 used in motor mode, in order to produce the desired set-point torque Cc(t) on the flywheel 1, and the opposite torque −Cc(t) on the platform 110 by reaction. As the speed of the flywheel 1 increases, the electrical charge contained in the supercapacitor 4 decreases and the electrical power necessary for the acceleration of the flywheel 1 increases.

A further object may be to simplify the electronics and operate it below a given power, in order to prevent energy over-consumption during the acceleration phase. To this end, the spacecraft attitude control system which comprises at least one actuator device as described herein may be suitable for calculating a set-point for a torque to be produced by at least one actuator device in order to rotate said spacecraft about at least one axis of rotation of the flywheel of said device such that an absolute value of said torque set-point is less than or equal to Pmax/|ω|, where Pmax is a constant, as soon as an absolute value |ω| of the rotation speed ω of said flywheel about said axis of rotation becomes greater than a maximum value ωmax. At the same time, the maximum power requested from the actuator device is less than Pmax.

In this case, for the set-point not to adopt a value above a maximum torque value Cmax, the absolute value of said torque set-point to be produced by the device may also be chosen as less than or equal to the lesser of the two values Cmax and Pmax/|ω|, i.e. less than or equal to Min(Cmax, Pmax/|ω|).

It may advantageously be chosen as equal to the lesser of the two values Cmax and Pmax/|ω|, i.e. equal to Min(Cmax, Pmax/|ω|), in order to maximise the set-point torque to reduce the duration of the acceleration phase.

An acceleration limit may possibly be reached when the voltage at the terminals of the supercapacitor 4 reaches a lower limit, and/or when the speed of the flywheel 1 reaches an upper limit. In this case, the flywheel 1 can no longer continue to be accelerated and it is possible to switch to the operation phase with constant satellite rotation speed. During this second phase, the respective rotation speeds of the flywheel 1 and the satellite 100 are practically constant, and the torque applied by the motor-generator 2 on the axis of the flywheel 1 is practically zero.

During the deceleration phase, the flywheel 1 is decelerated using the motor-generator 2 in generator mode. In this case, the motor-generator 2 produces an electrical current which is converted by the control electronics 3 to an electrical charge, said charge being transferred in the supercapacitor 4 so as to recharge the same.

The same constraints apply for this deceleration phase, and it will be advantageous to adopt a torque set-point wherein the absolute value is limited by the same values as those defined above for the acceleration phase.

To be able to make the desired operations, the satellite may comprise an attitude control system which incorporates at least one actuator device as described herein, and frequently at least three such devices. The attitude control system is then suitable for adjusting the total energy contained in at least one of said actuator devices to a minimum value making it possible, by means of energy transfer, to rotate the satellite at a maximum speed $\Omega_{max}$ fixed in advance, about an axis of rotation $\Delta$ of the satellite which is also fixed.

More specifically, the actuator system comprising at least one actuator as described herein is activated, from an idle state (flywheels at zero speed), to produce the kinetic moment required for the rotation of the satellite, by means of reaction, to the speed $\Omega_{max}$ about the axis of rotation $\Delta$. The rotation speeds are considered in absolute values. This gives the following equation:

$$J_{satellite}(\Delta) \times \Omega_{max} = \gamma(\Delta) \times J_{flywheel} \times \omega,$$

where $J_{satellite}(\Delta)$ is the momentum of inertia of the satellite about the axis $\Delta$, $J_{flywheel}$ is the momentum of inertia of the flywheel about its own axis, $\omega$ is the greatest rotation speed of all the rotation speeds of the flywheels producing the rotation of the satellite, and $\gamma(\Delta)$ is the amplification factor between, on one hand, the maximum kinetic momentum $H(\Delta)$ liable to be produced by the actuator along the direction $\Delta$, and, on the other hand, the maximum kinetic momentum $H_{flywheel}$ liable to be produced by a flywheel of the actuator device along at least one axis of rotation, according to the formula $H(\Delta)=\gamma(\Delta) \times H_{flywheel}$. The final kinetic energy of the satellite, $Esat_{max}$, of rotation about the axis $\Delta$, is equal to $\frac{1}{2} J_{satellite} \times \Omega_{max}^2$. The final kinetic energy of the flywheel is simultaneously equal to:

$$\frac{1}{2 \times \gamma(\Delta)^2} \times J_{satellite}(\Delta) \times \Omega_{max}^2 \times \frac{J_{satellite}(\Delta)}{J_{flywheel}} = \frac{1}{\gamma(\Delta)^2} \times \frac{J_{satellite}(\Delta)}{J_{flywheel}} \times Esat_{max}.$$

This quantity of energy must be stored initially in the supercapacitor of at least one of the actuator system devices, in electrical form. It may also be distributed throughout the actuator devices of the attitude control system, as a function of the priority directions about which the satellite will be rotated during the mission thereof.

As examples, the inventors cite the following features liable to apply to actuator devices for satellite of the 300 kg to 1 tonne class:
- the flywheel 1 may have a diameter between 350 and 500 mm (millimeter), and mass between 4 and 8 kg (kilogram);
- the motor-generator 2 may be of the brushless multiphase synchronous type.

It may be selected to produce a torque between 3 and 10 N.m. Its peak electrical power may be greater than 500 W (watt), particularly between 500 and 1000 W. Such a motor is commercially available and may have a mass between 5 and 10 kg;
- the control electronics 3 may have an energy output which is greater than 95% during a transfer of electrical energy between the capacitive element 4 and the motor-generator 2; and
- the supercapacitor may have an electrical energy storage capacity which is greater than 5000 J (joule), particularly between 5000 and 15000 J, for a capacitive assembly mass which may be between 0.5 and 1.5 kg.

Under these conditions, the maximum kinetic moment that can be stored in an actuator may reach from 25 to 40 N.m.s (Newton×meter×second), given that the greater this value is, the higher the satellite tilting speed may be.

The rotor of the motor-generator 2, with which the flywheel 1 is coupled in rotation, is equipped with permanent magnets; the stator comprises one or more windings. Respective electrical power suppliers of these windings are switched in synchronism with the rotation of the rotor, using a sensor of the angular position thereof with respect to the stator. In this way, a desired magnetic torque may be produced with precision.

In linear operating mode, the current Im delivered to the motor-generator 2 operating in motor mode, or produced by the motor-generator 2 operating in generator mode, is substantially proportional to the torque produced Cm, motor or resistant respectively. In other words: Cm=Kt×Im, where Kt is the torque constant. In a known manner, this constant Kt is also involved in the expression of the counter-electromotive force E of the motor-generator 2 as follows: E=Kt×ω, where ω is the rotation speed of the rotor.

The set-point representative of the torque to be produced may correspond to a value of the electrical current Im flowing in the motor-generator 2, a value of the torque Cm to be produced by the motor-generator 2, or a variation value of the kinetic momentum of the flywheel 1. The term "set-point corresponding to a value of a parameter" refers to any relationship whereby the set-point is a function of the parameter value, such as, for example, a proportionality relationship between the set-point and the parameter. In particular, when the set-point corresponds to a value of the electrical current Im flowing in the motor-generator, the actuator device may also comprise at least one measurement sensor of said current. In this case, the control electronics are suitable for adjusting the electrical energy transferred between the motor-generator and the capacitive assembly as a function of a deviation between the set-point and a measurement of the current flowing in the motor-generator.

In other words, to produce a torque in accordance with a torque set-point Cc, the control electronics 3 may control the motor current Im at the desired value Ic=Cc/Kt. When the value measured for Im is equal to Ic, then the torque Cm produced is equal to the set-point Cc.

According to a particularly advantageous embodiment, a pulse switching autopilot device may make it possible to direct, for the motor operating mode, or recover, for the generator operating mode, the current Im alternatively in each of the windings of the stator, in a synchronised fashion with respect to the position of the rotor. The measurement sensor of the current Im produces the value measured Imm. As a function of the deviation between the value measured Imm and the set-point value Ic, the control electronics 3 may deliver a cyclic switching ratio R at the stator winding input. The mean voltage Vm which is present between the electrical terminals of the motor-generator 2 is in this case equal to R×Vs, where Vs is the output voltage between the two terminals of the supercapacitor 4. The cyclic ratio R is adjusted so that Vm is, in absolute values, greater than the counter-electromotive force E (|Vm|>E) in motor mode, and less than E(|Vm|<E) in generator mode, while Imm is substantially equal to Ic in terms of its mean value. The control of Imm with respect to Ic is performed advantageously in a closed loop, by adjusting the cyclic ratio R as a function of the deviation between the two values.

The most important physical parameters cited above are indicated in FIG. 2, in a standard manner so that those skilled in the art can reproduce the operation described above.

Figure 3:
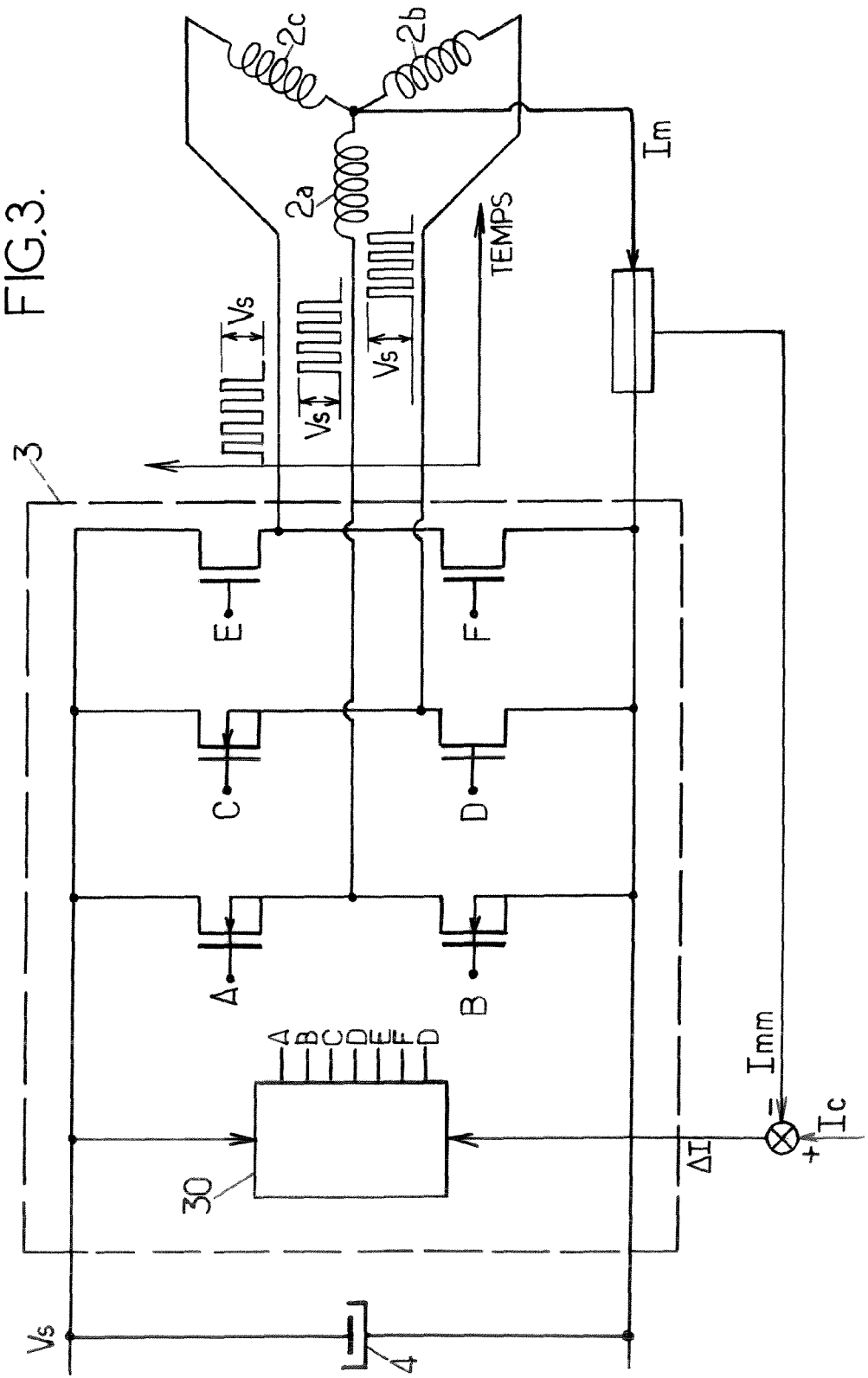
FIG. 3 is an electrical diagram of a specific electrical connection mode of a motor-generator used in an actuator device according to the invention.

FIG. 3 corresponds to FIG. 2 when the stator of the motor-generator 2 comprises three windings which are referenced 2a, 2b and 2b. It shows a possible connection for the three-phase current power supply of the windings 2a, 2b and 2c, inside the electronics 3. Each winding is connected to a mid-point of a circuit arm which is in turn connected to the two terminals of the supercapacitor 4. Said circuit arm comprises, for the winding 2a (or 2b, or 2c), an upper switching transistor A (or C, or E) which enables or inhibits the power supply of the winding, and a lower switching transistor B (or D, or F) which adjusts the cyclic ratio R. The switching transistor control electrodes A-F are respectively connected to outputs of a microcontroller 30, which receives at the input thereof a signal representative of the deviation ΔI between the current value measured Imm and the set-point value Ic.

Typically, such a motor-generator 2 power supply current clipping control operates with a switching frequency of the transistors B, D and F which is between 20 and 100 kHz (kilohertz), the phase switching by the transistors A, C and E being performed at a frequency typically between 0 and 1 kHz according to the rotation speed ω. Such clipping control electronics make it possible to control a mean motor current value Im with the set-point value Ic, while synchronising the power supply currents of the windings of the stator of the motor-generator 2 with respect to the position of the rotor.

Advantageously, the supercapacitor 4 may be designed such that the voltage at the terminals thereof is always significantly greater than the maximum counter-electromotive force E generated by the motor when it is running at maximum speed, throughout the operating range of the device. Under these conditions, the control electronics 3 do not require an elevation stage of the voltage Vs which is delivered by the supercapacitor 4, in order to power the motor. The electronics 3 in this case are simpler. As a general rule, the capacitive assembly may advantageously be suitable for displaying a residual electrical voltage between the two output terminals thereof which is greater than the counter-electromotive force of the motor-generator 2, after the flywheel has accelerated to the maximum speed from an initial state where the flywheel is immobile and the capacitive assembly contains a maximum electrical energy. In particular, the residual electrical voltage which is present between the output terminals of the capacitive assembly may be greater than twice the counter-electromotive force of the motor-generator, after the flywheel has accelerated to the maximum speed from the initial state.

The capacitive assembly may also be suitable for displaying a residual electrical voltage, between the two output voltages thereof, which is reduced by a factor less than two with respect to the initial state where the flywheel is immobile and the capacitive assembly contains a maximum electrical energy, after the flywheel has been accelerated to a maximum speed from said initial state.

Moreover, the control electronics 3 may use the inductance of the windings of the stator of the motor-generator 2 to recharge the supercapacitor 4 in generator mode, without an additional voltage elevation device being necessary on the motor-generator 2.

Finally, it should be noted that the use of a supercapacitor makes it possible to filter to a large extent the high-frequency electromagnetic interference produced by the actuator device, such that the filters that sometimes need to be added to the control electronics to attenuate these interference effects are simplified. This filtering represents another advantage of an actuator device according to the invention.

The energy outputs of the motor-generator 2 and the control electronics 3, and the Joule effect dissipations induce electrical energy losses. Similarly, friction occurring in the motor-generator 2 and in the rotation of the flywheel 1 induces mechanical energy losses. For these reasons, the total energy of the actuator device, which is equal to the sum of the electrical energy stored in the supercapacitor 4 and the kinetic rotation energy of the flywheel 1, decreases if the losses are not compensated. In this case, the role of the power converter 5 is to compensate for these losses from the satellite power bus, to maintain the total energy of the device between specified values. Advantageously, the transfers of power from the satellite power bus, which are controlled by the converter 5, have time constants much longer than those involved in the control of the motor-generator 2 by the electronics 3. In other words, the variations of the power extracted from the satellite power bus are slower, for example approximately by at least a factor of ten, with respect to the variations of the electrical power transferred between the supercapacitor 4 and the motor-generator 2, although the actuator device can produce high torques. Indeed, the instantaneous electrical power which is required to produce such a torque is delivered from the supercapacitor 4, and not directly from the satellite power bus. In this way, no interference is induced with respect to the other satellite equipment powered using the power bus. These other items of equipment may in this case have a regular and stable operation, which represents another advantage of an actuator device according to the invention with respect to the devices according to the prior art.

Such control of the total energy of the actuator device may advantageously be performed using a closed loop control system, using measurements of the electrical charge contained in the supercapacitor 4 and/or the kinetic energy of the flywheel 1. It is performed in accordance with a set-point which is representative of a value of the total energy of the actuator device. This total energy is equal to $\frac{1}{2} C \cdot Vs^2 + \frac{1}{2} Jr \cdot \omega^2$, where C is the capacitance of the supercapacitor, Vs the voltage at the terminals thereof, Jr the momentum of inertia of the flywheel about the axis of rotation in question, and ω the rotation speed of the flywheel.

It should be noted that when the rotation speed of the flywheel is low, the total energy may be approximated by the electrical energy ½ C·Vs² contained in the supercapacitor, such that, in this case, the voltage Vs at the terminals of the supercapacitor represents a value representative of the total energy of the device via the equation Vs=(2E/C)^(1/2).

In this way, according to a first control mode of the total energy of the actuator device, the set-point representative of a value of the total energy may depend only on a value of the electrical energy to be stored in the capacitive element when a rotation speed of the flywheel about the axis thereof is simultaneously less than a speed threshold. In this case, said set-point may be advantageously equal or proportional to the voltage at the terminals of the capacitive element.

Figure 4:
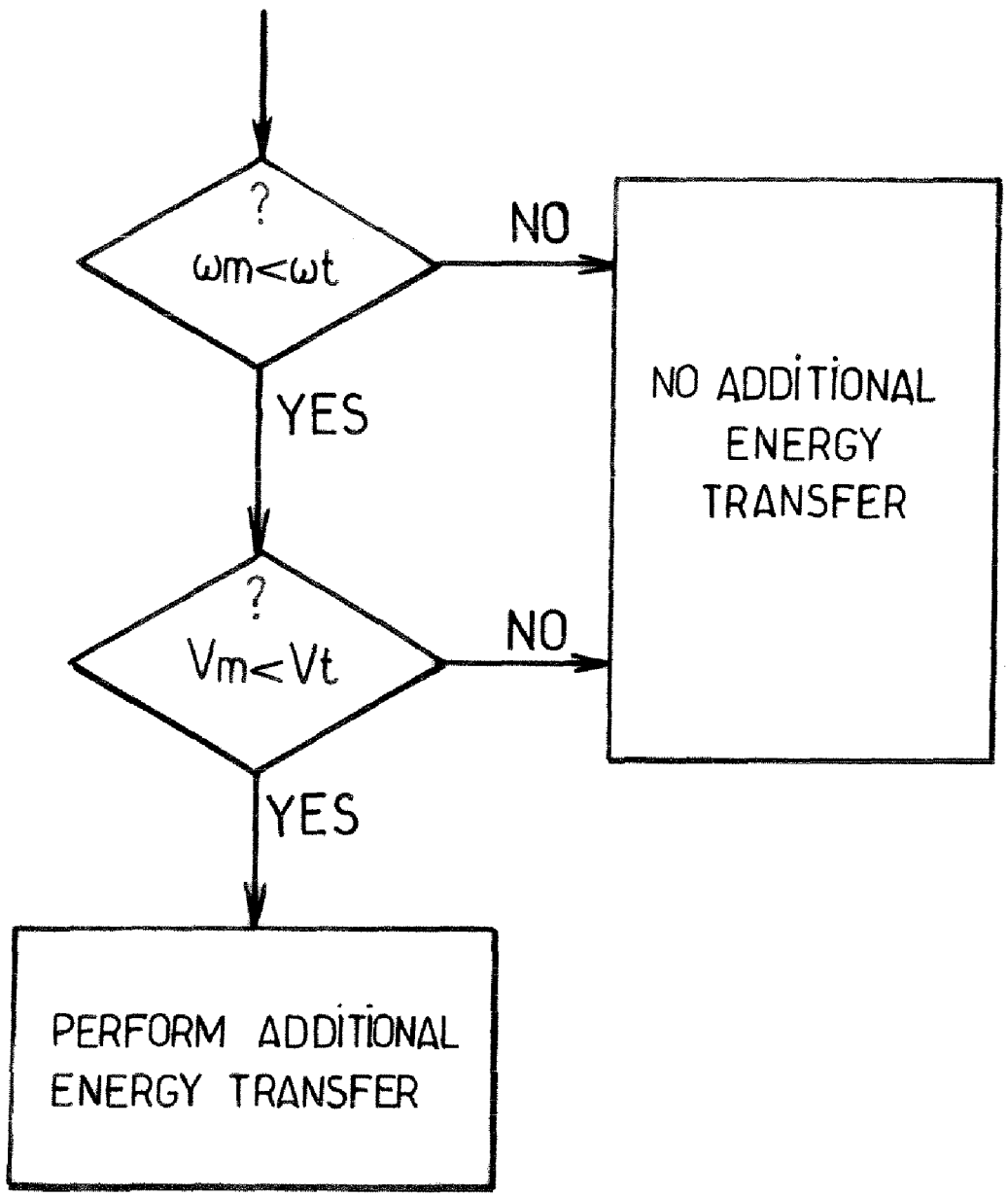
FIG. 4 is a logic diagram of a total energy control mode of an actuator device according to the invention.

FIG. 4 is a logic diagram which illustrates an embodiment of said first control mode of the total energy of the actuator device. ωt and Vt refer to the threshold values respectively for the voltage Vs at the terminals of the capacitive assembly and for the rotation speed of the flywheel.

According to a second control mode of the total energy of the actuator device, the set-point may correspond directly to a total energy value. In this case, it may be advantageously or proportional to said total energy.

In any case, the electrical power converter may be suitable for controlling an additional electrical energy transfer from the satellite power bus when at least one representative value of the total energy of the actuator device is less than a threshold fixed for said value.

The additional electrical energy transfer may be interrupted when at least one representative value of the total energy of the actuator device is greater than a threshold fixed for said value.

For each of the control modes, the electrical power converter may comprise a low-pass filter, which is arranged such that the additional electrical energy transfer is carried out from a transfer control filtered by said filter.

Moreover, it is possible to control a charging of the capacitive assembly, i.e. of the supercapacitor 4 in the case described herein, in an open loop for a subsequent known attitude variation of the satellite. This makes it possible to ensure that the charging level of the capacitive assembly will be sufficient to perform said subsequent attitude variation. For this purpose, the electrical power converter may also be suitable for receiving another set-point which corresponds to a temporal and dated additional electrical energy transfer sequence, from the spacecraft power bus to the capacitive assembly, and for controlling an execution of said sequence in an open loop.

Such an open loop charging of the capacitive assembly may be performed at the same time as a first attitude change operation, as described above. Such an enhancement of the invention is particularly advantageous in the cases of rapid sequences of a large number of satellite attitude change operations. Prior knowledge of said operations, via the operation plan, makes it possible to accumulate the total energy required by same over a suitable period. In addition, the open loop charging of the capacitive element may be performed in a superimposed way or in parallel with the closed loop regulation of the total energy of the actuator device. For example, the set-point value from which the total energy is regulated in a closed loop may be varied as a function of the manoeuvre plan.

As a general rule, the additional electrical energy transfer from the spacecraft power bus is controlled according to a time constant which is greater, or considerably greater, than any time constant associated with an electrical energy transfer between the capacitive assembly and the motor-generator, and which is adjusted by the control electronics. For example, the pass-band of the actuator device to control the attitude of the satellite may be below 1 to 2 Hz (Hertz), while the pass-band of the control of the total energy of the actuator device may be below 0.1 to 1 Hz.

The peak power sampled at the satellite electrical power supply bus may be less than 50 or 100 W, for example.

To control the total energy of the actuator device according to any of the control modes cited above, the actuator device may also comprise a first sensor which is arranged to measure the electrical voltage at the terminals of the capacitive assembly. This first sensor may be a voltmeter connected to the two output terminals of the capacitive assembly. It is also connected to transmit to the electrical power converter a first signal of an electrical voltage measurement carried out at the terminals of the capacitive assembly. The electrical power converter is in this case suitable for adjusting the additional electrical energy transfer on the basis of said first measurement signal.

The actuator device may further comprise at least one sensor which is arranged to measure a rotation speed of the flywheel about the axis of rotation of said flywheel. Said second sensor may be a tachymeter which is coupled with the flywheel 1. It is also connected to transmit to the electrical power converter a second measurement signal, and the electrical power converter may be suitable for only controlling an additional electrical energy transfer if the rotation speed of the flywheel is less in absolute value than the speed threshold.

When the actuator device comprises both the first and the second sensor, the electrical power converter may be suitable for adjusting the additional electrical energy transfer on the basis of the deviation between a set-point representative of the total energy of the actuator device and the corresponding value calculated on the basis of the first and second measurement signals. In particular, the value calculated on the basis of the first and second measurement signals may be equal to proportional to the total energy which is contained in the device.

Figure 5:
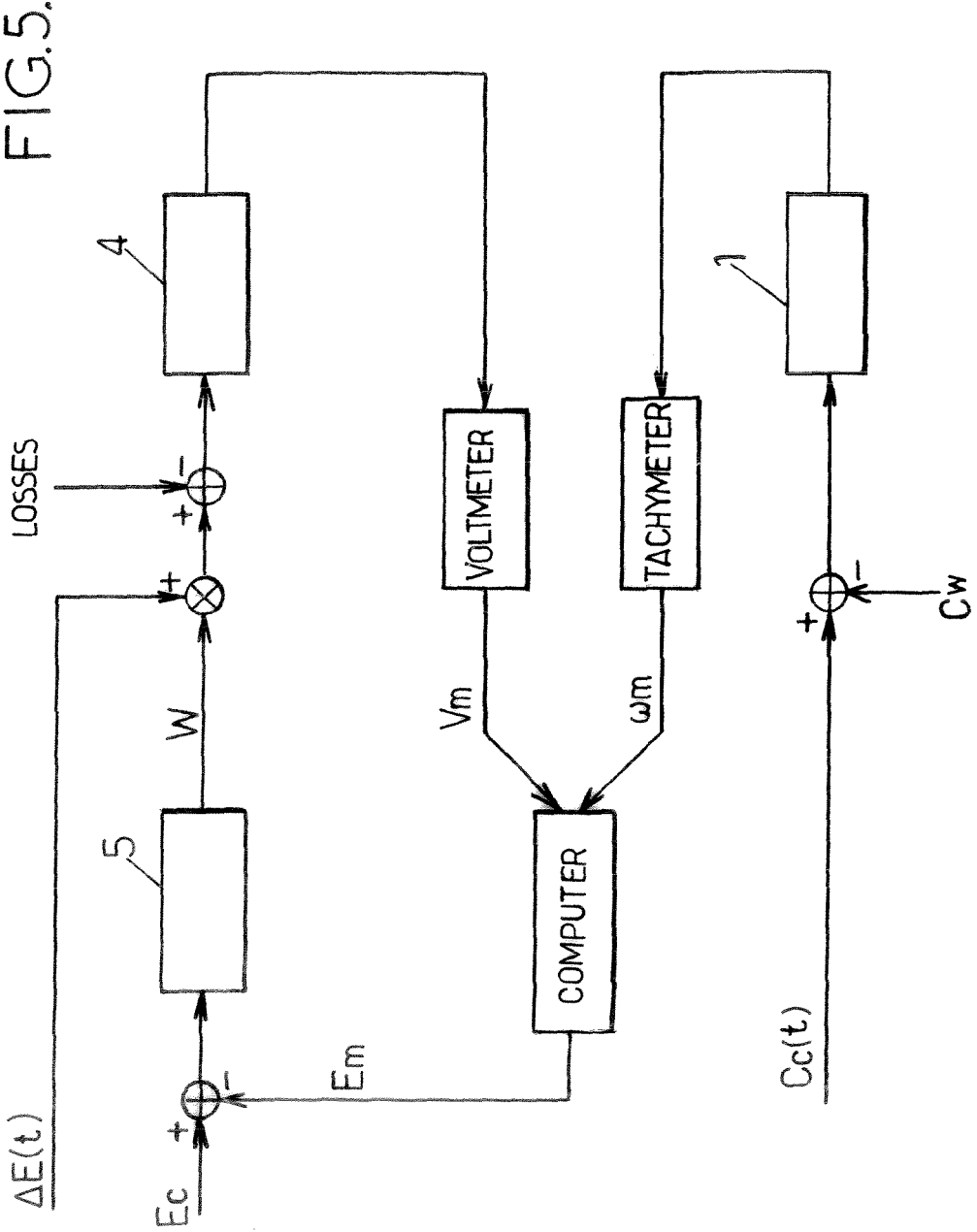
FIG. 5 is a principle diagram of another total energy control mode of an actuator device according to the invention.

FIG. 5 is a diagram which illustrates the second control mode of the total energy of the actuator device, described above. The components of this diagram are indicated according to standard usage, so that said diagram may be understood directly by those skilled in the art. In said diagram, Ec and Em refer respectively to the set-point and the value calculated for the total energy of the actuator device, Cc and Cw refer respectively to the torque set-point and the torque losses caused by the friction occurring during a rotation of the flywheel, Vm and ωm refer to the values measured respectively for the voltage at the terminals of the capacitive assembly and the rotation speed of the flywheel, W refers to the additional quantity of electrical energy transferred by the converter 5 to the supercapacitor 4, from the satellite power bus, and ΔE(t) is the regulation set-point in an open loop of the total energy of the actuator, t referring to the time variable.

Figure 6:
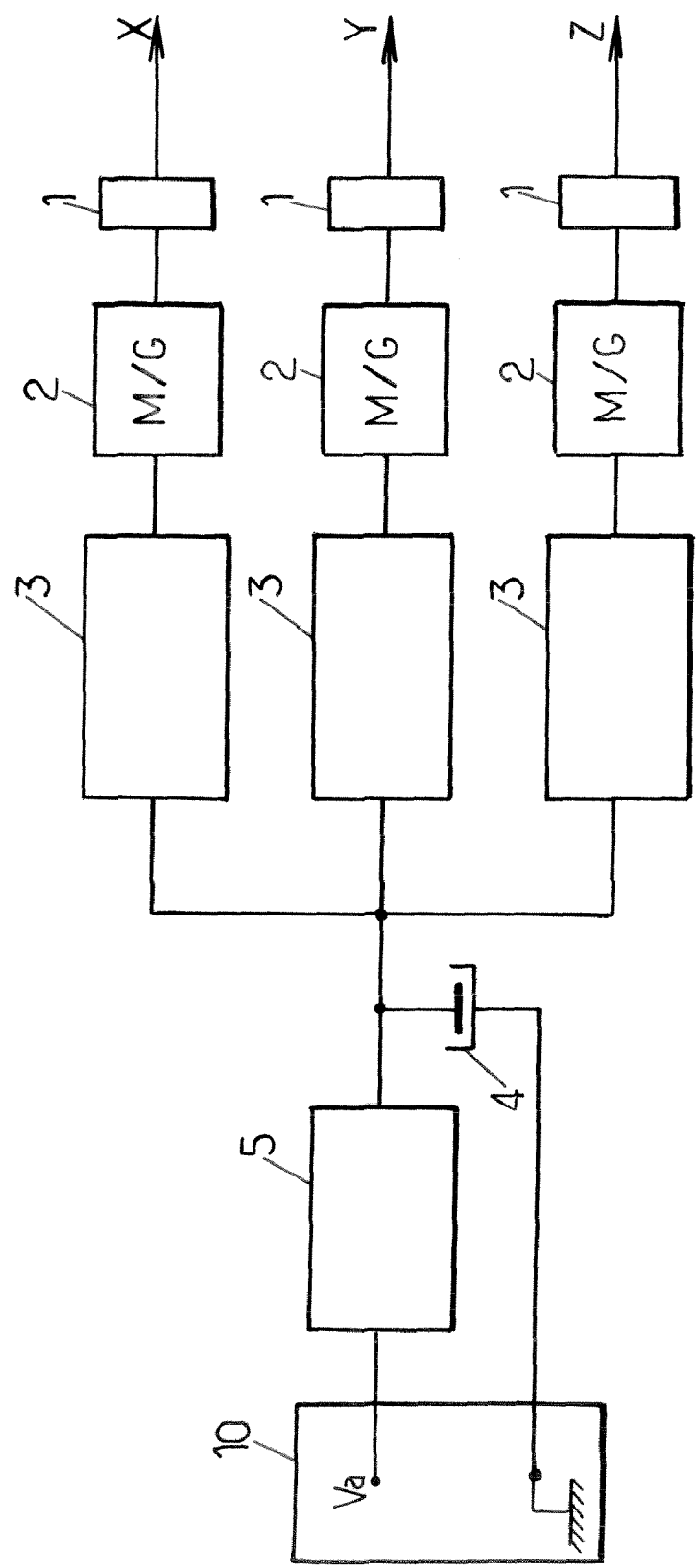
FIG. 6 is a principle diagram of an actuator system according to the invention.

In the case of the attitude control of satellite illustrated by FIG. 1, a vectorial torque set-point is decomposed along the three axes X, Y and Z, and the three torque components are produced simultaneously and independently by each actuator device, in the manner described. According to a first embodiment of the invention, the three actuator devices may be separate and independent. In this case, there is no transfer of electrical or mechanical energy between them. According to a second embodiment of the invention, a single capacitive assembly 4 and a single power converter 5 may be common to the three actuator devices, in accordance with FIG. 6.

It is understood that modifications and adaptations may be introduced with respect to the embodiments of the invention described in detail above, while retaining at least some of the advantages cited. These advantages include the following:

irrespective of the sequence of operations requested from the spacecraft, the power requests from the craft main power supply system will remain of a lower order of magnitude than the power transfers between the flywheels and the capacitive assembly of the actuator device;

between two successive tilting operations of the spacecraft, when the rotation speeds of the spacecraft about each axis are low, for example during an exposure, the rotation speeds of the flywheels may also be low. All the energy from the actuator devices is in this case contained in the capacitive assembly/assemblies, so that the vibrations liable to be induced by the flywheels are reduced considerably, or eliminated; and the actuator device according to the invention may be used exactly as for a conventional reaction wheel, as known prior to the present invention, for the attitude and orbit control of a spacecraft equipped with this type of actuator. This is true for all reaction wheel operating modes, particularly the low-torque fine pointing mode, the avoidance of zero speeds in the fine pointing phase, wheel management desaturation by means of auxiliary actuators, fault mode management, redundancy management, etc.

The invention claimed is:

1. Apparatus, comprising an actuator device for varying the attitude of a spacecraft, the actuator device comprising:
a reversible conversion chain of electrical energy to mechanical energy, including the following components:
a flywheel arranged to rotate about at least one axis of rotation;
a reversible operation motor-generator coupled with the flywheel by means of a rotation drive about said axis of rotation;
control electronics connected electrically to the motor-generator;
a capacitive electrical energy storage assembly connected electrically to said control electronics; and
an electrical power converter connected to the capacitive electrical energy storage assembly and which is configured for connection to a power bus of the spacecraft to feed the capacitive electrical energy storage assembly from said power bus,
wherein said control electronics are used for:
selecting, using at least one set-point representative of a torque to be produced along said axis of rotation and transmitted to said control electronics, either operation in motor mode or operation in generator mode of the motor-generator, and
adjusting a transfer of electrical energy from the capacitive electrical energy storage assembly to the motor-generator for the motor mode, or from the motor-generator to the capacitive electrical energy storage assembly for the generator mode, in order to produce an acceleration or deceleration of the flywheel respectively about said axis of rotation, suitable for producing a reaction torque onto the spacecraft corresponding to said set-point.

2. Apparatus according to claim 1, wherein the capacitive electrical energy storage assembly comprises at least one supercapacitor.

3. Apparatus according to claim 1, wherein the set-point representative of the torque to be produced corresponds to a value of an electric current flowing in the motor-generator, the torque to be produced by the motor-generator or a variation of a kinetic momentum of the flywheel.

4. Apparatus according to claim 1, wherein the capacitive electrical energy storage assembly is suitable for having a residual electrical voltage between two output terminals of said capacitive assembly, greater than a counter-electromotive force of the motor-generator, after the flywheel has accelerated to a maximum speed from an initial state wherein the flywheel is immobile and the capacitive electrical energy storage assembly contains a maximum electrical energy.

5. Apparatus according to claim 1, wherein the electrical power converter is suitable for controlling an additional transfer of electrical energy from the spacecraft power bus to the capacitive electrical energy storage assembly, according to at least one set-point representative of a total energy value of the actuator device and received by said electrical power converter, said total energy being equal to a sum of a kinetic rotation energy of the flywheel and the electrical energy stored in the capacitive electrical energy storage assembly.

6. Apparatus according to claim 5, wherein the set-point representative of a value of the total energy of the actuator device corresponds directly to a value of said total energy, and
wherein the actuator device also comprises a first sensor arranged to measure a voltage at the terminals of the capacitive electrical energy storage assembly, and connected to transmit to the electrical power converter a first measurement signal of said voltage, and
wherein the actuator device also comprises at least one second sensor arranged to measure a rotation speed of the flywheel about at least one axis of rotation of said flywheel, and connected to transmit to the electrical power converter a second measurement signal of said rotation speed, and
wherein said electrical power converter is suitable for adjusting said additional electrical energy transfer on the basis of the deviation between said set-point representative of the total energy of the actuator device and a corresponding value calculated on the basis of the first and second measurement signals.

7. Apparatus according to claim 5, wherein the electrical power converter comprises a low-pass filter arranged so that said additional electrical energy transfer is carried out from a transfer command filtered by said filter.

8. Apparatus according to claim 1, further comprising another actuator device providing at first and second actuators devices, wherein at least the first and second actuator devices share one and same common capacitive electrical energy storage assembly and one and same common electrical power converter connected to said common capacitive assembly.

9. Apparatus according to claim 8, wherein, for each actuator device, the control electronics are suitable for controlling transfers of electrical energy between the corresponding capacitive electrical energy storage assembly and motor-generator, so that the flywheel of each actuator device produces a torque component parallel with at least one axis of rotation of said flywheel, in accordance with a set-point received by said control electronics.

10. Apparatus according to claim 8, wherein the common electrical power converter is suitable for controlling an additional transfer of electrical energy from the power bus of the spacecraft to the common capacitive electrical energy storage assembly, in accordance with at least one set-point which is representative of a value of the total energy of the at least two actuator devices, said total energy of the at least two actuator devices being equal to the sum of the respective total energies of said actuator devices, and
wherein the common electrical power converter is suitable for controlling the additional transfer of electrical energy so that said transfer is equal to a sum of additional transfers of electrical energy controlled respectively for said actuator devices each used separately, in accordance with set-points representative of values of total energies respectively contained in the actuator devices, each actuator device total energy being individually equal to the sum of the kinetic rotation energy of the flywheel and of the electrical energy stored in the capacitive electrical energy storage assembly of said actuator device.

11. Apparatus according to claim 1, suitable for calculating set-points for a torque to be produced about at least one axis of rotation of the flywheel of the actuator device, on the basis of deviations between kinematic parameters such as attitude and/or rotation speed of the spacecraft about said at least one axis and set-points corresponding to said kinematic parameters.

12. Apparatus according to claim 11, wherein the system is provided onboard the spacecraft which is intended to perform rotations about a determined axis of rotation of said spacecraft, wherein total energy of the actuator device is adjusted to a value greater than or equal to:

$$\frac{1}{2 \times \gamma(\Delta)^2} \times J_{craft}(\Delta) \times \Omega_{max}^2 \times \frac{J_{craft}(\Delta)}{J_{flywheel}},$$

where $J_{craft}(\Delta)$, $\Omega_{max}$ and $J_{flywheel}$ are, respectively, a moment of inertia of the spacecraft about said determined axis of rotation of said craft, a maximum rotation speed of the spacecraft about the determined axis of rotation of said craft, and a moment of inertia of said actuator device about the axis of rotation of said flywheel, and where $\gamma(\Delta)$ denotes an amplification factor between a maximum kinetic momentum liable to be produced by the actuator device along the direction $\Delta$, and the maximum kinetic momentum liable to be produced by a flywheel of the actuator device along at least one axis of rotation.

13. Spacecraft attitude control system, comprising at least one actuator device for varying the attitude of a spacecraft, each actuator device comprising:
  a reversible conversion chain of electrical energy to mechanical energy, including the following components:
    a flywheel arranged to rotate about at least one axis of rotation;
    a reversible operation motor-generator coupled with the flywheel by means of a rotation drive about said axis of rotation;
    control electronics connected electrically to the motor-generator;
    a capacitive electrical energy storage assembly connected electrically to said control electronics; and
  an electrical power converter connected to the capacitive electrical energy storage assembly and which is configured for connection to a power bus of the spacecraft to feed the capacitive electrical energy storage assembly from said power bus,
  wherein said control electronics are used for:
    selecting, using at least one set-point representative of a torque to be produced along said axis of rotation and transmitted to said control electronics, either operation in motor mode or operation in generator mode of the motor-generator, and
  adjusting a transfer of electrical energy from the capacitive electrical energy storage assembly to the motor-generator for the motor mode, or from the motor-generator to the capacitive electrical energy storage assembly for the generator mode, in order to produce an acceleration or deceleration of the flywheel respectively about said axis of rotation, suitable for producing a reaction torque onto the spacecraft corresponding to said set-point.

14. Spacecraft attitude control system as in claim 13, wherein the at least on actuator device comprises a first actuator device and a second actuator device.

15. Spacecraft attitude control system according to claim 13, suitable for calculating set-points for a torque to be produced about at least one axis of rotation of the flywheel of the at least one actuator device, on the basis of deviations between kinematic parameters such as attitude and/or rotation speed of the spacecraft about said at least one axis and set-points corresponding to said kinematic parameters.

16. Spacecraft attitude control system according to claim 13, wherein the system is provided onboard a spacecraft which is intended to perform rotations about a determined axis of rotation of said spacecraft, wherein total energy of the at least one actuator device of the attitude control device is adjusted to a value greater than or equal to:

$$\frac{1}{2 \times \gamma(\Delta)^2} \times J_{craft}(\Delta) \times \Omega_{max}^2 \times \frac{J_{craft}(\Delta)}{J_{flywheel}},$$

where $J_{craft}(\Delta)$, $\Omega_{max}$ and $J_{flywheel}$ are, respectively, a moment of inertia of the spacecraft about said determined axis of rotation of said craft, a maximum rotation speed of the spacecraft about the determined axis of rotation of said craft, and a moment of inertia of said actuator device about the axis of rotation of said flywheel, and where $\gamma(\Delta)$ denotes an amplification factor between a maximum kinetic momentum liable to be produced by the actuator device along the direction $\Delta$, and the maximum kinetic momentum liable to be produced by a flywheel of the actuator device along at least one axis of rotation.

* * * * *